SEGER & ORMISTON.
Wheel Cultivator.
No. 59,279.                Patented Oct. 30, 1866.
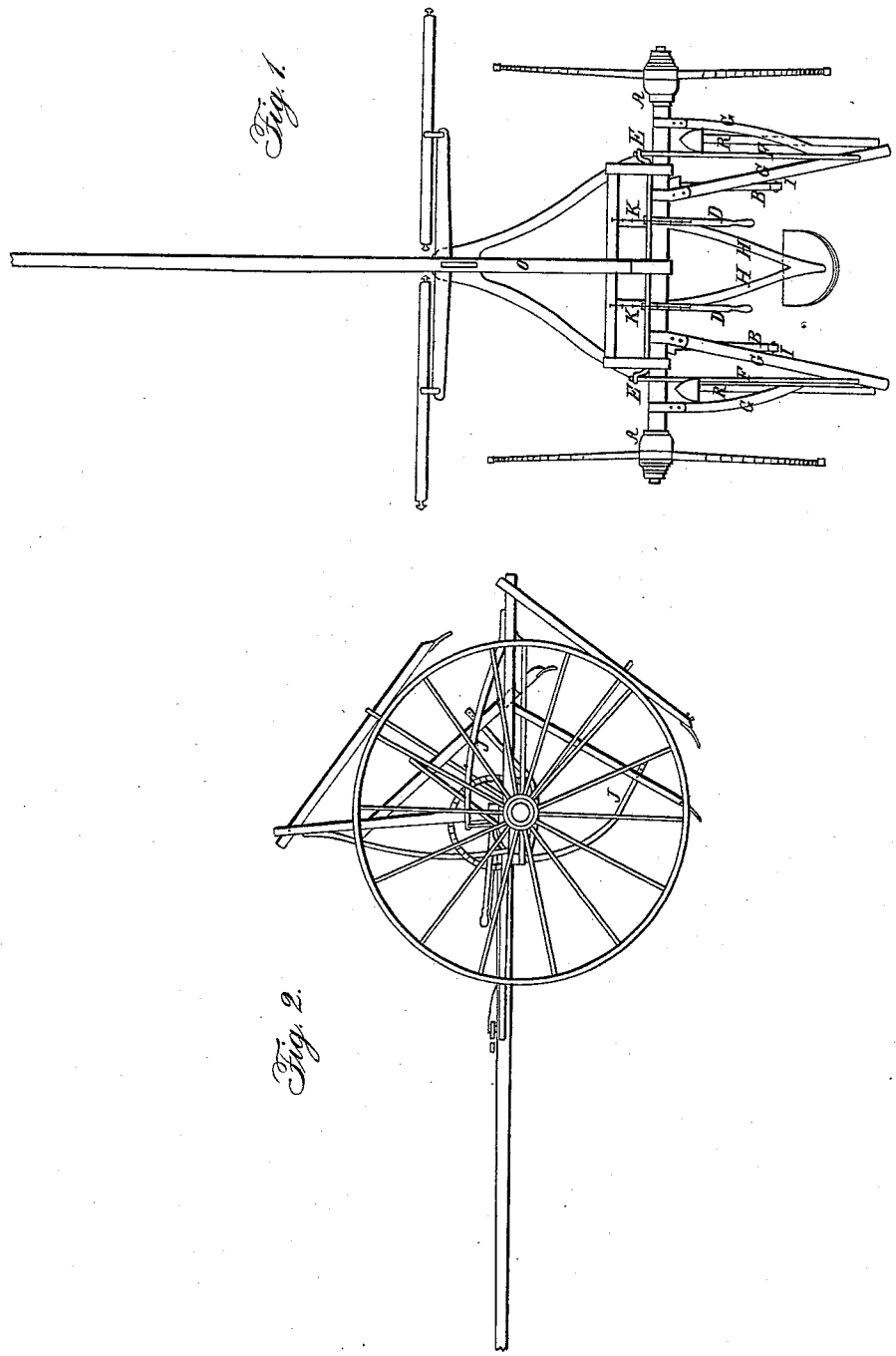

UNITED STATES PATENT OFFICE.

E. S. SEGER AND J. C. ORMISTON, OF ERIE, ILLINOIS.

IMPROVEMENT IN CULTIVATORS.

Specification forming part of Letters Patent No. 59,279, dated October 30, 1866.

*To all whom it may concern:*

Be it known that we, EDMUND S. SEGER and JOHN C. ORMISTON, of the town of Erie, county of Whiteside, and State of Illinois, have invented a new and useful Improvement on a Corn-Plow or Cultivator; and we do hereby declare that the following is a full, clear, and exact description of the construction and operation of the same, reference being had to the annexed drawings, making a part of this specification, in which—

Figure 1 is a perspective view, and Fig. 2 a sectional view.

Letter A represents the wheels and axle. Letter G represents the crotch or braced beams, which are fastened or attached to the axle by a strap revolving hinge. Letter B represents the standards and shovels, which are attached to the beams with iron hinges. Letter I represents the blade-hinges that attach the inside standards and shovels to the beams. Letter J represents the braces attached to the shovel-standards with iron bolts, and hitched to the cross-piece and axle in front by staple-hinge. The braces attached to the inside shovel-standards are used for braces and stirrups to guide the shovels combined. Letter H represents the crotch bearing-seat, attached to the axle and cross-bar on the under side of each, and runs back between the two inside shovel-standards. Letter F represents the pitman-rod, which is attached to the hind end of the beams by a rowlock-hinge, and attached in front to the iron cranks over the axle. Letter E represents the iron cranks over the axle. Letter D represents the spring-catch lever, which is attached to the iron cranks, and works on and over a ratchet-circle. Letter K represents the ratchet-circle, which is attached to the axle and cross-bar on the under side of the tongue, and arching over the cranks, and running through the spring-catch levers at the iron catch. Letter O represents the tongue, &c.

We claim that this plow is superior to any other plow now in use in construction and in operation, as may be seen from the following description of the construction and operation: The pitman, iron cranks, ratchet-circle, and spring-catch lever, as it is attached to the beams, enable the operator to raise and lower the shovels to suit the condition of any kind of land. It can be gaged to plow deep or shallow on level and uneven ground, in dead-furrows and on ridges. By means of this lever-power the operator can cultivate corn-stalk and foul ground, and raise and lower and clean his shovels without leaving his seat.

In operating this plow the operator or driver, as he sits upon the seat with his feet in the brace-stirrup, with his toes inclining out, sits easy and natural as a man sits in a chair, and in cultivating corn there is no part of the machine that obstructs his sight from the corn-row. He can look through the crotch upon which his seat is fastened and have a clear view of his business.

What we claim as our invention, and desire to secure by Letters Patent, is—

The application to a corn-plow or cultivator of the crotch-beams and strap revolving hinge, and pitman-rod, iron cranks, ratchet-circle, and spring-catch lever, attached to the beams by the pitman-rod and hinge, to raise and lower the beams and shovels, and the blade-hinges to attach the inside shovel-standards to the beams, the brace foot-stirrup to guide the inside shovels, and the crotch bearing-seat, as herein described, reference being had to the drawings herewith submitted.

EDMUND S. SEGER.
JOHN C. ORMISTON.

Witnesses:
HIRAM FOSKIT,
JOHN S. BURRIDGE.